United States Patent [19]

Gokcen

[11] 4,218,416

[45] Aug. 19, 1980

[54] METHOD FOR EXTRUDING A PARISON

[75] Inventor: Cem M. Gokcen, Waukegan, Ill.

[73] Assignee: Baxter Travenol Laboratories, Inc., Deerfield, Ill.

[21] Appl. No.: 959,581

[22] Filed: Nov. 13, 1978

[51] Int. Cl.$^2$ ............................................. D01D 5/20
[52] U.S. Cl. .................... 264/167; 264/541; 425/532; 425/381; 425/465; 425/466
[58] Field of Search ............... 264/541, 167, DIG. 33; 425/532, 381, 465, 466

[56] References Cited

U.S. PATENT DOCUMENTS

| | | | |
|---|---|---|---|
| 3,078,507 | 2/1963 | Park | 264/541 |
| 3,176,494 | 4/1965 | Cullen et al. | 425/381 X |
| 3,312,766 | 4/1967 | Stevens | 264/541 X |
| 3,420,926 | 1/1969 | Mason et al. | 264/541 X |

*Primary Examiner*—Jan H. Silbaugh
*Attorney, Agent, or Firm*—H. W. Collins; Paul Flattery; Thomas Vigil

[57] ABSTRACT

The method and apparatus are useful in forming a parison which has a varying wall thickness and an outer diameter larger than the outer diameter of the annular outlet orifice from which the parison is extruded. Such a parison is obtained by adding additional molten thermoplastic material to the parison while extruding the same to vary the thickness of portions of the parison. The additional molten material is directed radially outwardly from the axis of the parison to increase the wall thickness and to increase the swell of the parison which is defined as the ratio of the inner diameter of the parison to the outer diameter of the outlet orifice. Also the ratio of the outer diameter of the parison to the inner diameter of a mold in which the parison is blowmolded into a container is reduced permitting a larger container to be formed from the thicker portion of the parison while having a small entrance opening formed from a thin wall portion of the parison. The apparatus includes an extrusion head for extruding the parison from a circular outlet opening in the bottom of the head which is, coaxial with a plunger received in a central passageway in the extrusion head. The plunger can be lowered to allow additional molten material to flow from the central passageway and through an annular orifice defined between the lower end of the plunger and the circular outlet opening. This lower end has an annular frustoconical surface for directing the additional molten thermoplastic material being added to the parison radially outwardly from the axis of the parison to obtain the increased swell and increased wall thickness of the parison.

3 Claims, 8 Drawing Figures

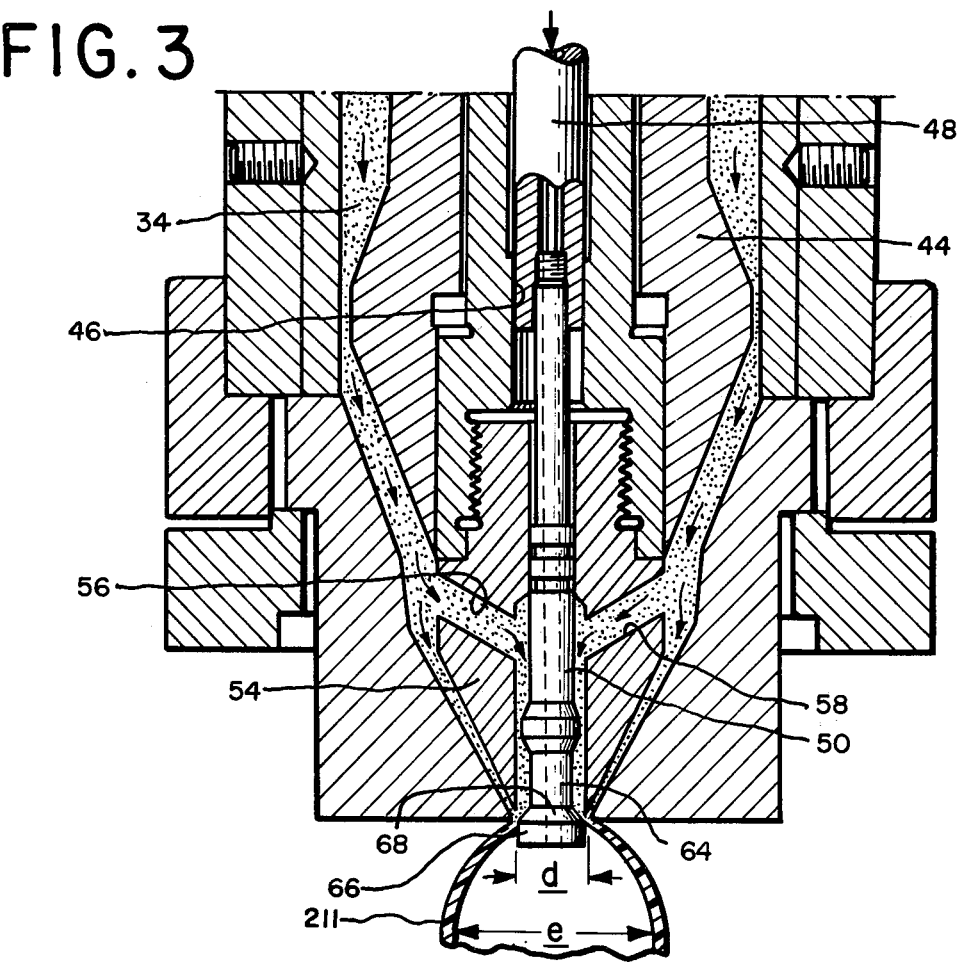
FIG. 3
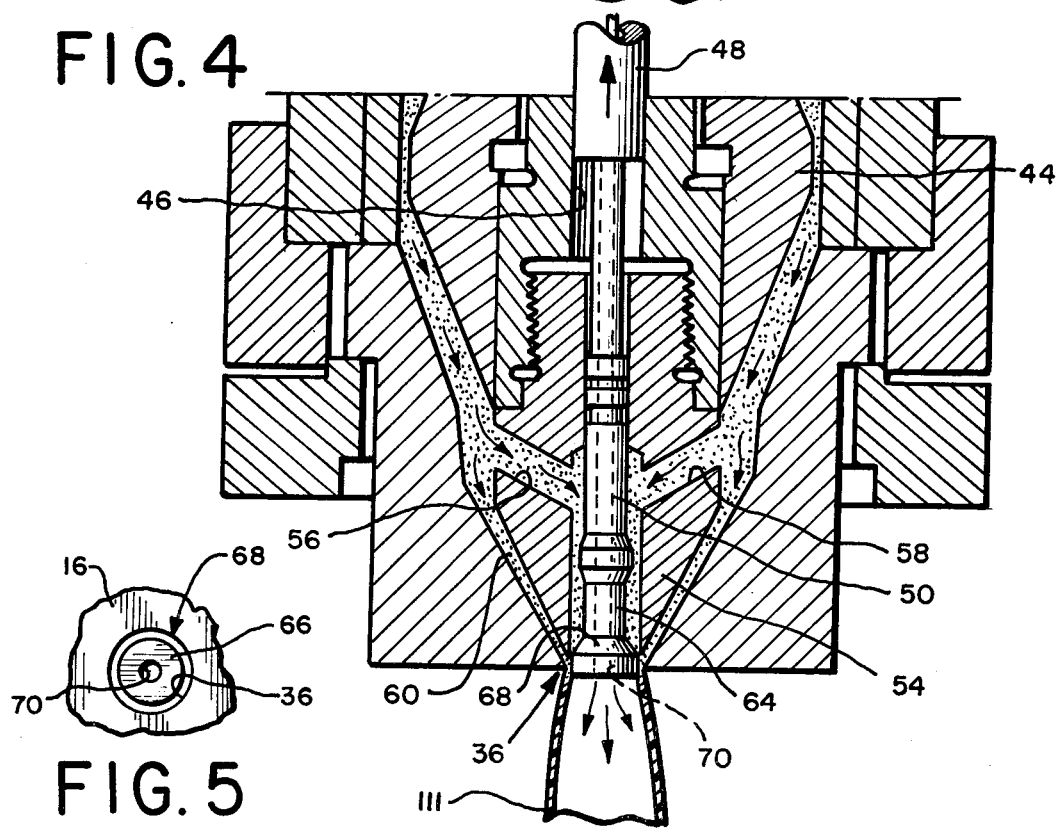
FIG. 4
FIG. 5

METHOD FOR EXTRUDING A PARISON

BACKGROUND OF THE INVENTION

1. Field of the Invention

The field of the invention is a method and apparatus for extruding a parison (a tube of molten thermoplastic material) which is then placed in a die for blowmolding a container from the parison. More specifically, the present invention relates to a method and apparatus for varying the wall thickness of the parison and the swell—the outer and inner diameter—of the parison as the parison is extruded so that large containers with small neck entrance openings can be formed from the parison.

2. Description of the Prior Art

Heretofore it has been proposed to control the wall thickness of a parison by altering the amount of molten thermoplastic material which is extruded through a die head. In one such system disclosed in Kim et al. U.S. Pat. No. 4,029,458, a hydraulic or pneumatic activating system is utilized for raising or lowering a mandril which is situated completely internally of the die head to control the wall thickness of the parison which is extruded from the die head. However, with the mandril located within the die head, movement of the mandril, although controlling the wall thickness of the parison, does not affect of significantly alter the effective outer diameter of the parison extruded from the die head.

Also it has been proposed in the Stevens U.S. Pat. Nos. 3,221,371 and 3,312,766 to vary the wall thickness of a parison being extruded by adding material to the parison as it is being extruded. More specifically, these patents disclose that the wall thickness of the parison can be altered by adding material to the outside circumference of the parison thereby increasing the outer diameter of the parison without however altering the inner diameter of the parison. Also these patents teach the varying of the wall thickness of the parison by controlling the flow of molten thermoplastic material out of a fixed annular orifice located on the inside or the outside of the primary die annular orifice. Also, both the primary and secondary annular orifices open onto the bottom of the die head.

In the conventional blowmolding of a container, an extruded parison is circumscribed by a female mold. Then, air is blown internally into the tube or parison to expand the size thereof against the inner walls of the mold so that the parison takes the shape of the mold to form a container. It will be appreciated that the larger the ratio of the diameter of the mold to the outside diameter of the parison the harder it is to uniformly distribute the plastic material.

When blowmolding a large container with a small opening, the outside diameter of the parison cannot exceed the diameter of the small opening. The size of the small opening then limits the size of the parison and the blowup ratio, i.e., the ratio of the outer diameter of the parison to the inner diameter of the mold which is preferably not greater than 1:4.

If one could vary the swell of the parison, that is, the ratio of the inner diameter of the parison to the outer diameter of the ring shaped annular outlet orifice from which the parison is extruded, then a large container with a small neck entrance opening can be formed. Presently the only known method for obtaining a large container with a small entrance opening is by preblowing the parison. This is done by the injection of air internally of the parison before the mold closes so as to form a bladder with a small neck. Unfortunately, however, there is still a problem of varying the wall thickness of the parison since the part of the parison that will be expanded the most to fill the mold and form the container has to have a sufficient wall thickness of material.

It will be appreciated that if the wall thickness of the parison is barely sufficient to expand to a desired wall thickness for the container in the mold, the weakest portion of the parison will expand first getting thinner than the rest of the parison. In this respect the thinner sections expand first contacting the mold and offsetting the parison towards the opposite wall. This problem becomes more pronounced as the blowup ratio (outer diameter of the parison to the inner diameter of the mold) increases.

As will be described in greater detail hereinafter, the method and apparatus for extruding a parison of the present invention differ from the previous methods and apparatus by providing for the varying of the wall thickness and the varying of the swell of the parison as it is being extruded to produce a parison which has sufficient wall thickness where the greatest amount of expansion will take place and which has a larger swell so as to reduce the blowup ratio thereby to provide a parison from which a large container with a small neck entrance opening at the end of the parison where minimum wall thickness and minimum swell are provided can be formed from the parison.

SUMMARY OF THE INVENTION

According to the invention there is provided a method for extruding a parison for use in blowmolding a large container having a small entrance opening, said method comprising the steps of: extruding a tubular parison of molten thermoplastic material through a fixed outer dimension, variable inner dimension, closed loop extrusion orifice; decreasing the inner dimension of the orifice so as to increase the width of the orifice and adding material to the parison while extruding the same to vary the thickness of portions of the parison relative to the extent those portions of the parison will be expanded by blowmolding in a mold; and, mechanically directing the additional molten thermoplastic material added to the parison radially outwardly from the central axis of the parison to increase the inner and outer dimensions of the parison being extruded thereby (1) to increase the ratio of the inner dimension of the mold to the outer dimension of the parison and (2) to increase the ratio of the inner dimension of the extruded parison to the fixed outer dimension of the orifice so that large containers with small entrance openings can be blowmolded from the extruded parison.

Further according to the invention there is provided an apparatus for extruding a parison of molten thermoplastic material comprising an extrusion head having an outlet opening at the bottom thereof, having means for coupling said head to a source of molten thermoplastic material and having passage means therein communicating said coupling means to said bottom outlet opening, a central passageway extending through at least a portion of said head and communicating with said bottom outlet opening, radial passage means between said passage means and said central passageway, said bottom outlet opening having a larger outer dimension of said central passageway, a plunger received in said central passageway and having a stem portion which has an outer dimension less than the dimension of the passageway and having a plug-like lower end portion with an outer dimension substantially equal to the dimension of said passageway and being adapted to be received in and to close off the lower end of said central passageway communicating with said outlet opening, the space between the outer dimension of said plug-like end portion and the outer dimension of said outlet opening defining a fixed outer dimension, closed loop, outlet orifice through which the parison is extruded, and said plunger having means between said plug-like end portion and said stem for changing the inner dimension of said outlet orifice, and for directing the molten thermoplastic material flowing axially downwardly in said passageway radially outwardly from the axis of said plunger when said plunger is lowered to communicate said central passageway with said passage means within said extrusion head above said outlet opening such that molten thermoplastic material flowing out of said central passageway and added to the parison formed from the molten plastic material flowing through said passage means to said outlet opening and through said outlet orifice is directed outwardly from the central axis of the parison being extruded.

Still further according to the invention there is provided in an apparatus having an extrusion head with an annular outlet orifice at the bottom thereof for extruding a molten thermoplastic parison, the improvement comprising an outlet orifice defined, at one position, between a circular bottom outlet opening and a smaller diameter movable end portion at the lower end of a stem of a plunger and, at a second position, between said circular bottom opening and an annular frusto-conical surface situated between said end portion and said stem, said outlet orifice being variable between said first position where said orifice is defined by a downwardly facing ring-shaped annular orifice having a minimum width, through intermediate positions where said orifice is a conical annular orifice facing downwardly and outwardly from the extrusion head to said second position where said orifice is a conical annular orifice which faces downwardly and outwardly which has a maximum width and which has a maximum conical direction generally parallel with the slope of said frusto-conical surface.

BRIEF DESCRIPTION OF THE DRAWINGS

FIG. 3 is a fragmentary sectional view of the bottom portion of the extrusion head showing a plunger in the head in a lowered position where additional molten thermoplastic material is added to the parison to increase the wall thickness of the parison and is directed outwardly from the axis of the plunger to increase the swell of the parison.

FIG. 4 is a fragmentary sectional view of the bottom of the extrusion head similar to FIG. 3 but showing the plunger in a raised position where a thinner walled parison with less swell is formed by the extrusion head.

FIG. 5 is a fragmentary bottom view of the extrusion head taken along line 5—5 of FIG. 1 and shows the bottom outlet orifice of the extrusion head.

DESCRIPTION OF THE PREFERRED EMBODIMENT

Figure 1A:
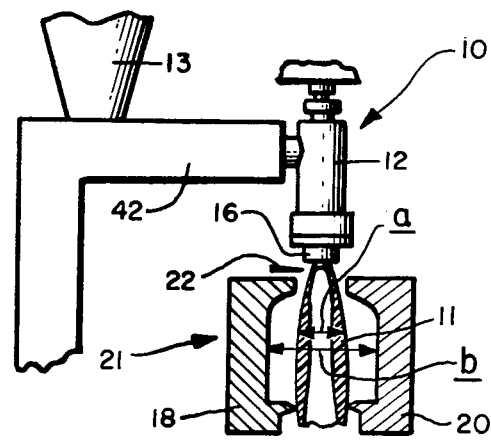
FIG. 1a is an elevational view of the apparatus of the present invention including an extrusion head connected to a source of molten thermoplastic material and showing a parison being extruded from the extrusion head and showing, in section, two die parts which are received about the parison.

Referring now to the drawings in greater detail, there is illustrated in FIG. 1a an apparatus 10 for extruding a parison 11. The apparatus 10 includes an extrusion head 12 which is constructed in accordance with the teachings of the present invention and is coupled to a source 13 of molten thermoplastic material. The parison 11 is extruded from the bottom 16 of the extrusion head 12.

Figure 1B:
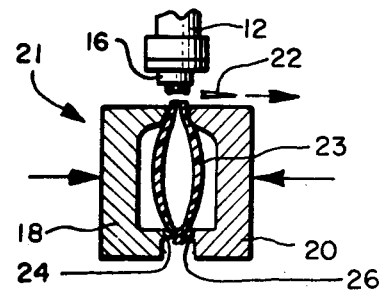
FIG. 1b is a fragmentary vertical sectional view similar to FIG. 1a showing the lower end of the extrusion head and the two die parts when they are moved together to capture a portion of the parison.
Figure 1C:
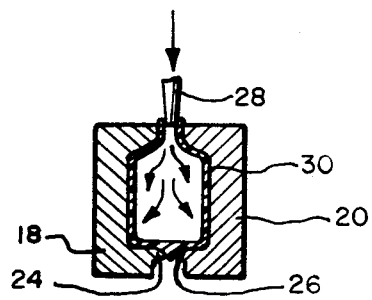
FIG. 1c is a vertical sectional view of the mold when a blow tube is inserted into the parison to blow the parison out into the mold to form a container.
Figure 1D:
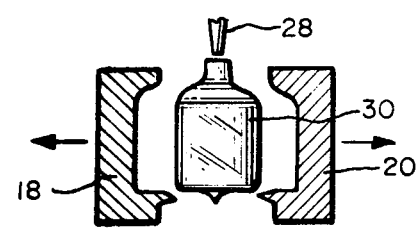
FIG. 1d is a vertical sectional view of the mold after the container has been formed therein and the die parts have been moved away from each other.

The parison 11 flows between two die parts 18 and 20 which together define a mold 21 for forming a plastic container (30 in FIG. 1d). After a portion of the parison 11 has been extruded, a reciprocally mounted knife 22 situated beneath the bottom 16 of the extrusion head 12 is moved across the path of the parison 11 from left to right as shown in FIG. 1a to cut off a section 23 of the parison 11. At the same time, the die parts 18 and 20 are moved toward each other to collect or gather in the parison section 23 within the mold 21 formed by the die parts 18 and 20. As shown, the mold parts 18 and 20 each have a lower knife edge 24, 26 which pinch off the bottom of the parison section 23 when the die parts 18 and 20 come together.

As shown in FIG. 1c, after the die parts 18 and 20 have been brought together, a blow pin 28 is inserted into the upper opening of the parison section 23 and air is blown into the mold 21 to blow out the wall portions of the parison section 23 against the walls of the mold 21 to form a container 30.

Afterwards, the blow pin 28 is raised as shown in FIG. 1d and the die parts 18 and 20 are moved away from each other to release the plastic container 30 thus formed.

The method and apparatus for blowmolding a container as described above are conventional except for the particular construction of the extrusion head 12 and the method for using same which will now be described below.

Figure 2:
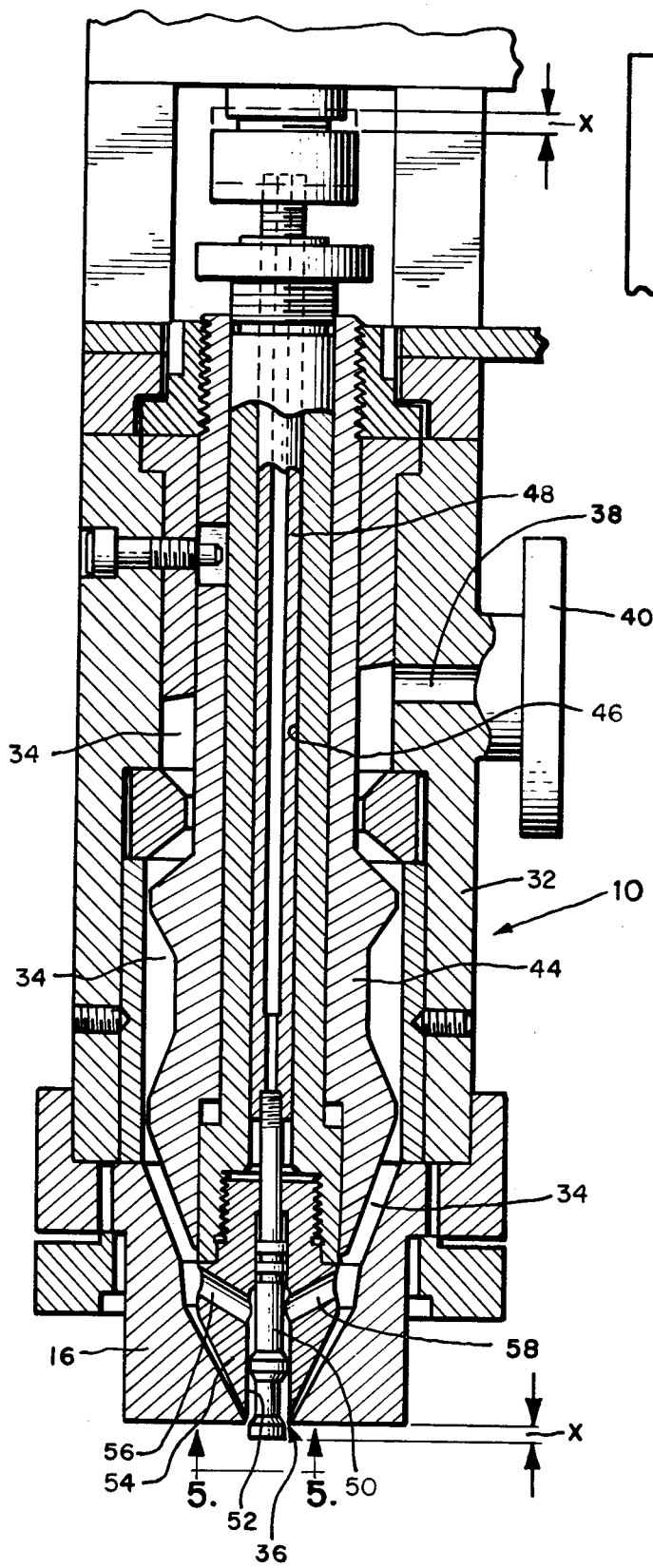
FIG. 2 is a vertical view, partly in section, of the extrusion head of the present invention.

As shown in FIG. 2, the extrusion head 12 includes a housing 32 having a generally annular passage formation 34 therein which extends within the extrusion head 12 between an outlet opening 36 in the bottom portion 16 of the extrusion head 12 and a passageway 38 in a coupling head 40 which is adapted to couple the extrusion head 12 to a duct 42 connected to the source 13 of molten thermoplastic material which is typically polyvinyl chloride, polyethylene, polypropylene or ethyl vinyl acetate.

Within a central body portion 44 of the extrusion head 12 radially inwardly of the generally annular passage formation 34, is an elongate bore 46 mounting a mandril 48 therein. The lower end of the mandril 48 has a plunger 50 mounted thereon which is movable within a central passageway 52 formed within a lower section 54 of the central body portion 44. Also as shown, the lower section 54 has at least two radial passageways 56 and 58 therein which communicate between the generally annular passage formation 34 and the central passageway 52. In this way the generally annular passage formation 34 not only forms a passage means between the coupling head 40 and the outlet opening 36 but also between the coupling head 40 and the central passageway 52.

As shown in FIGS. 2, 3, and 4, the generally annular passage formation 34 includes a generally conical passageway 60 formed internally of and within bottom portion 16 of the extrusion head 10 and between the bottom portion 16 and the lower section 54 of the central body portion 44. This annular frustoconical passageway 60 terminates at the outlet opening 36 which is a fixed outer diameter, circular outlet opening 36 which is concentric with the axis of the plunger 50 at the lower end of the mandril 48.

The plunger 50 has a lower stem 64 which has an outer diameter less than the diameter of the central passageway 52, a plug-like end portion 66 at the lower end of the stem 64, and an annular frusto-conical surface 68 extending between the plug-like portion 66 and the lower stem 64. The plug-like end portion 66 has an outer diameter substantially equal to the diameter of the central passageway and when it is in its raised position shown in FIG. 4, it is adapted to close off the central passageway 52 and prevent communication from the central passageway 52 to the lower end of the frusto-conical passageway 60 where it meets with the bottom outlet opening 36.

As best shown in FIG. 5, a ring shaped annular outlet orifice 68 is defined between the diameter-circumference of the plug-like end portion 66 and the diameter-circumference of the circular bottom outlet opening 36.

The mandril 48 and the plunger 50 have an axial passageway 70 therethrough for communicating the interior of the parison 11 being formed by the extrusion head 12 with ambient air thereby to prevent a vacuum from forming within and collapsing the parison 11.

In the operation of the extrusion head 12, a suitable control mechanism (not shown) is connected to the upper end of the mandril 48 to cause raising and lowering of the mandril 48 and plunger 50 as desired within a limited axial extent X as shown in FIG. 2. When the plunger 50 is in a raised position the plug-like end portion 66 will close off the central passageway 52 and a parison 111 will be extruded having a minimal wall thickness equal to the radial dimension of the annular outlet orifice 68 and a minimum swell as shown in FIG. 4. This is the wall thickness needed at the upper end of the parison when it is desired to form a small neck entrance opening.

Then, when portions of the parison 11 which are going to be expanded the most in the mold 21 are formed, the plunger 50 is moved to the lower position shown in FIGS. 2 and 3 where additional thermoplastic material is added to the parison 11 being formed and is deflected radially outwardly from the axis of the parison 11 and plunger 50 by the frusto-conical surface 68 between the plug-like end portion 66 and the stem 64.

It will be appreciated that as the plunger moves from the raised position to the lowered position, the annular outlet orifice will pivot about and around the circular bottom opening 36 and increase in width. In other words, it changes from a circular annular orifice with a minimum width through conical annular orifices of decreasing slope (decreasing from 90°) and increasing width to a conical annular orifice of maximum width and a slope approximately equal to the slope of the frusto-conical surface 68.

In accordance with the teachings of the present invention, this directing outwardly of the additional material being added to the parison to form a thicker walled parison 211 not only forms a thicker walled parison 211 but also causes the thermoplastic material being extruded to bellow or swell outwardly so that the blowup ratio of the outer diameter a (FIG. 1a) of the parison 11 relative to the inner diameter b (FIG. 1b) of the mold 21 formed by the die parts 18 and 20 is less than would be obtained but for the directing outwardly of the added molten thermoplastic material—see the parison 211 in FIG. 4. Since the size of the plastic container that can be made from a given parison is limited by this blowup ratio, by increasing the outer dimension of the parison, one can utilize a larger mold to form a larger container.

Note also that the swell is increased which facilitates the blowmolding. In this respect, another limitation on the size of the container that can be formed from a parison extruded from a given extrusion head is the swell which is the ratio of the inner diameter d (FIG. 3) of the parison (11, 111, 211) formed to the outer diameter e (FIG. 3) of the outlet orifice 68 at the bottom of the extrusion head 12. As best shown in FIG. 3, by directing the added material radially outwardly of the axis of the plunger 50 a greater swell is obtained than would normally be obtained by presently available extrusion heads.

However, as best shown in FIG. 4, one still can have a conventional parison extrusion with a smaller swell when the plug-like end portion 66 is in the raised position closing off the central passageway 52 whereby only molten thermoplastic material flowing through the frusto-conical annular passageway 60 is delivered to the outlet orifice 68 defined between the outer diameter of the plug-like end portion 66 and the fixed outer diameter of the outlet opening 36. In this way, a small neck entrance opening to the container can be formed with the extrusion head 12 of the present invention.

The method for using the extrusion head of the present invention comprises the steps of: extruding a tubular parison of molten thermoplastic material through a fixed outer dimension, closed loop orifice; adding material to the parison while extruding the same to vary the thickness of portions of the parison relative to the extent those portions of the parison will be expanded by blow-molding in a mold; and, directing the additional molten thermoplastic material added to the parison radially outwardly from the central axis of the parison to increase the outer dimension of the parison being extruded thereby to decrease the ratio of the inner dimension of the mold to the outer dimension of the parison and to increase the ratio of the inner dimension of the extruded parison to the fixed outer dimension so that large containers with small entrance openings can be blowmolded from the extruded parison.

From the foregoing description it will be apparent that the method and apparatus of the present invention have a number of advantages some of which have been described above and others of which are inherent in the invention. Accordingly, the scope of the invention is only to be limited as necessitated by the accompanying claims.

I claim:

1. A method for extruding a parison for use in blow-molding a large container having a small entrance opening, said method comprising the steps of: extruding a tubular parison of molten thermoplastic material through a fixed outer dimension, variable inner dimension, closed loop extrusion orifice; decreasing the inner dimension of the orifice so as to increase the width of the orifice and adding material to the parison while extruding the same to vary the thickness of portions of the parison relative to the extent those portions of the parison will be expanded by blowmolding in a mold; and, as the inner dimension of the orifice is decreased, presenting means adjacent the orifice for mechanically directing the additional molten thermoplastic material added to the parison radially outwardly from the central axis of the parison to increase the inner and outer dimensions of the parison being extruded thereby (1) to decrease the ratio of the inner dimension of the mold to the outer dimension of the parison and (2) to increase the ratio of the inner dimension of the extruded parison to the fixed outer dimension of the orifice so that large containers with small entrance openings can be blowmolded from the extruded parison.

2. The method according to claim 1 wherein said fixed outer dimension, variable inner dimension, closed loop orifice is an annular orifice with a fixed outer diameter and a variable inner diameter.

3. The method according to claim 1 wherein said added material is directed outwardly by mechanically deflecting an axial flow of the added material outwardly from an annular frusto-conical surface as all the material exits from the extrusion orifice.

* * * * *